United States Patent [19]
Pezdark et al.

[11] 3,881,583
[45] May 6, 1975

[54] FLUID OPERATED STEERING CLUTCH AND BRAKE

[75] Inventors: Ben C. Pezdark; William C. Cleary, both of Butte, Mont.

[73] Assignee: The Anaconda Company, New York, N.Y.

[22] Filed: Aug. 30, 1973

[21] Appl. No.: 393,178

[52] U.S. Cl. .............................. 192/13 R; 192/83
[51] Int. Cl. ............................................ F16d 67/04
[58] Field of Search .......... 192/83, 99 S, 115, 85 C, 192/86

[56] References Cited
UNITED STATES PATENTS

| | | | |
|---|---|---|---|
| 2,223,535 | 12/1940 | Sinclair | 192/85 C |
| 2,780,334 | 2/1957 | Simmons | 192/84.14 X |
| 2,850,122 | 9/1958 | Alishouse | 188/279 X |
| 3,276,552 | 10/1966 | Wickman et al. | 192/85 C X |
| 3,498,433 | 3/1970 | Lohmann | 192/99 S |

Primary Examiner—Benjamin W. Wyche
Attorney, Agent, or Firm—Pennie & Edmonds

[57] ABSTRACT

A control mechanism for power driven machines is disclosed. The control mechanism includes a mechanical actuator with power assist to actuate a pair of clutch elements selectively in opposite directions into and out of position for engaging a drive and individual ones of a pair of driven members. A pair of quide bars and surrounding collar structure support the clutch elements for movement therealong. A pair of arms which provide support and stabilization of the clutch elements are connected at a diametrically opposed positions to the collar structure. Each arm is carried by and movable in an arc about the axis of a shaft. One of the arms serves as an actuator. A pneumatic motor is coupled to the shaft. Mechanical actuation and motor assist rotates the shaft and the arms to impart linear movement to the clutch elements along the guide bars.

1 Claim, 6 Drawing Figures

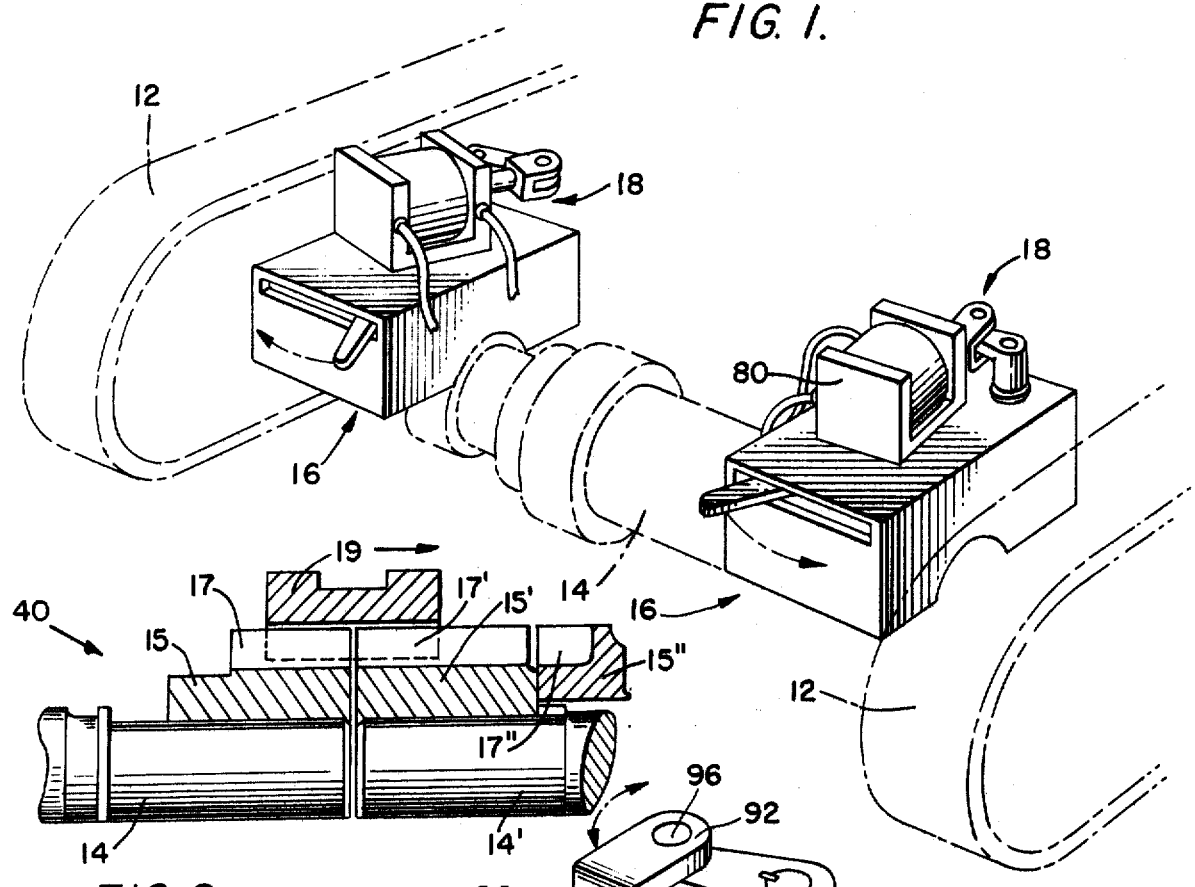
FIG. 1.
FIG. 6
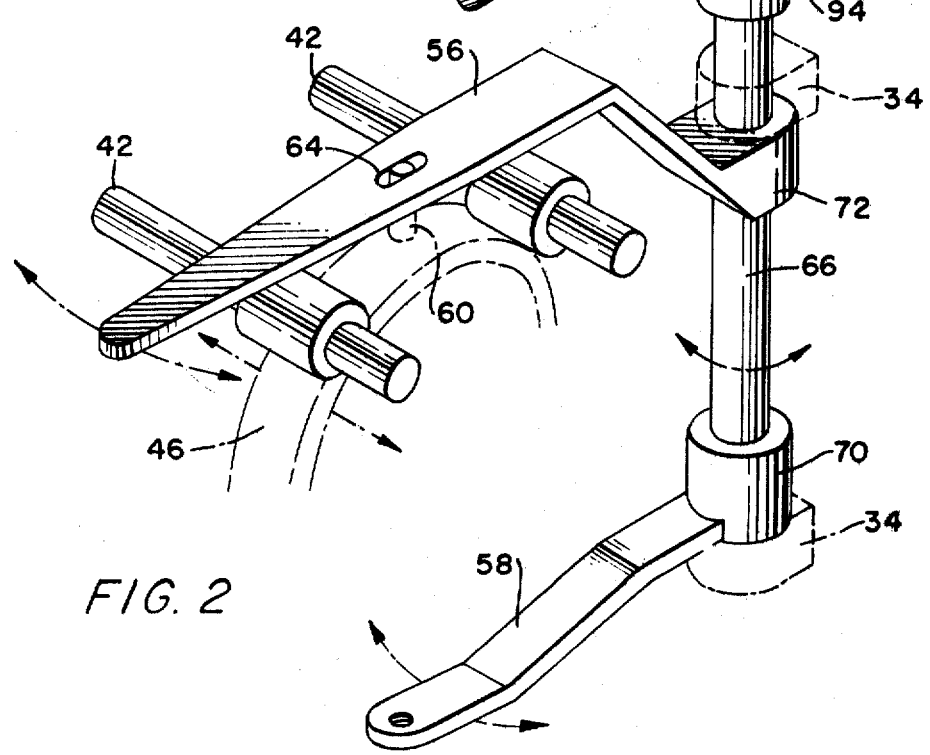
FIG. 2

FLUID OPERATED STEERING CLUTCH AND BRAKE

BACKGROUND OF THE INVENTION

The present invention relates to a control mechanism for steering powerized machines, particularly of the type having crawler treads as the ground contacting elements.

Typically, machines of this general type are steered by locking one or the other of the two crawler treads and applying power to the crawler tread not locked through the engagement of the drive and driven member by a clutch. Thus, the machine is capable of turning to one side or the other.

The various control mechanisms employed in the prior art are numerous. However, a control mechanism which is representative of those commonly in use today for steering a machine of the aforementioned type includes a clutch for each crawler tread or traction unit and means to move the clutch into and out of driving engagement with the driven member. The moving means in many applications includes a fluid motor to supply power to the clutch in one direction and a spring to apply power in the other clutch direction. This moving means generally is supported by a housing disposed within the area of the body of the machine and connected oftentimes to the clutch or clutch support structure by linkage systems of rather complex nature.

The disposition of the structure and the manner of operation is not without its disadvantages and problems. To this end the power motor and the spring are constantly opposing one another in movement, and mechanical and pneumatic structures which are rated in excess of what would otherwise be necessary to accomplish the desired movement of the clutch into and out of positions of engagement, disengagement and a locked position are required.

Further, the positioning of the power means within the area of the body of the machine and the linkage required to mechanically connect the power means to the clutch is a significant factor in increased costs of repair upon breakdown or necessary maintenance. Disposition of structure requiring sophisticated connecting linkages results in more opportunity of failure. Thus, greater down time is experienced. This all results in poor operator acceptance.

SUMMARY OF THE INVENTION

The present invention seeks to overcome the above disadvantages as well as to solve the problems existing in prior art mechanisms by the present improved control mechanism which will be described in conjunction with the drawing figures in detail below.

In a first important aspect, the present invention is significant in that it provides a redesign of the control mechanism and particularly the shifting assemblies to prevent binding of a clutch element during movement into various positions of engagement, disengagement and a locked position, and includes a double acting pneumatic assist motor located in close proximity to the shifting assemblies thereby to obviate the need for a complex linkage system to couple drive movement from a power motor to the shifting assemblies of the control mechanism. Particularly, the control mechanism, including the shifting assemblies, is located adjacent to the drive train in order to obtain better control in the movement of the clutch element into and out of the aforementioned conditions. The shifting assemblies are carried by a housing which is mounted to the frame in the vicinity of the rear end of the machine. Each shifting assembly is comprised of a pair of guide bars positioned in parallelism in the housing. The guide bars serve to support the clutch element by means of a collar carried by and surrounding the clutch element. The guide bars support the clutch element in the vicinity of the upper region, while a pair of arms, spaced apart vertically, assist in the support as well as provide stabilization for the clutch element in the vertical plane. The four point mounting of the clutch element serves to prevent binding in movement of the clutch element which might otherwise result. The spaced arms are keyed to a shaft for movement with the shaft. The shaft is carried within the housing and extends from the upper portion. A pneumatic means of power motor assist is supported by the housing and includes a double acting cylinder connected to suitable pressure sources. By means of a yoke and a crank lever, the latter also being keyed to the shaft for direct movement, the piston and rod may be coupled to the shaft. One of the arms may be movable to provide mechanical actuation and energize the pneumatic assist thereby to move the clutch element as steering requires.

Other important aspects of the invention will become more apparent as the description continues.

There has been thus outlined rather broadly the more important feature of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily realized as a basis for the designing of other structures for carrying out the several purposes of the invention. It is important, therefore, that the claims be regarded as including such equivalent construction as do not depart from the spirit and scope of the invention.

DESCRIPTION OF THE DRAWINGS

The accompanying drawings form a part of the present invention. By these drawings which illustrate a preferred form of the invention:

FIG. 1 is a perspective view, partially in phantom, of the mounting of the control mechanism and its relation to the drive train and driven element;

FIG. 2 is a view in perspective of the shifting assembly;

FIG. 6 is a schematic presentation of a conventional clutch mechanism for engaging and disengaging two rotating members of a machine and for locking one of the members.

DETAILED DESCRIPTION

Figure 3:
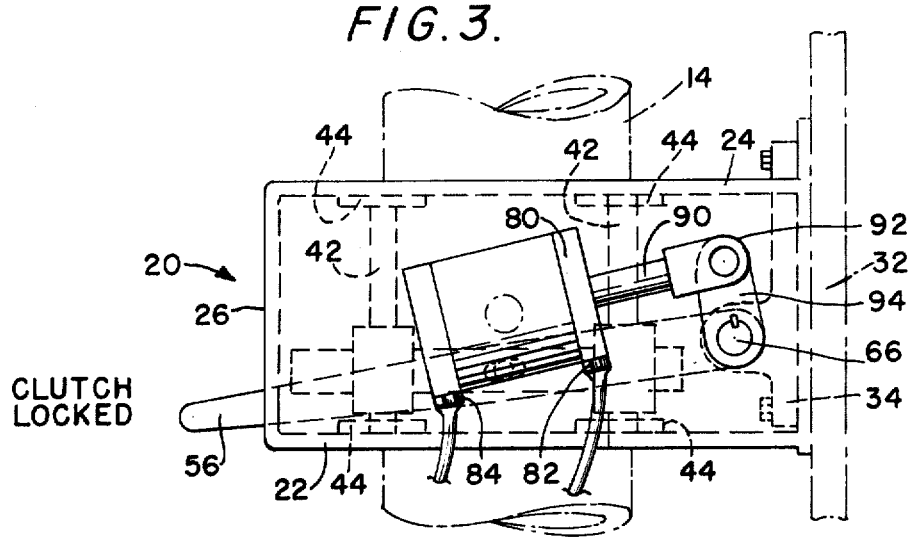
FIGS. 3 and 4 are top plan views of the shifting assembly having undergone movement to various clutch positions.

Referring now to the drawings, there is illustrated in FIG. 1 a schematic representation of the control mechanism of the present invention and the manner of mounting of the control mechanism for intercooperating drive and driven members of a machine. To this end the figure illustrates the rear end of the machine which, in the embodiment shown, is a machine of the general type providing ground contacting driven elements, such as crawler treads 12 and 13'. The control mechanism of the treads are presented in phantom outline on opposite ends of drive shaft 14, also in phantom outline. The present invention to be particularly described below functions to activate a clutch element in order to engage and disengage the drive shaft and crawler treads and to lock the crawler treads.

The control mechanism generally is represented by the numeral 16. FIG. 1 illustrates a pair of control mechanisms, one such mechanism controlling each of the respective crawler treads. As will be described, the control mechanism is actuated mechanically, with movement being obtained by means of power assist. To this end, the control mechanism includes fluid motor 18. The fluid motor 18 is directly cooperable with the control mechanisms to provide such power assist. While the invention may utilize a single fluid motor, it is preferred that a pair of motors each cooperable with an individual one of control mechanisms be employed. In the preferred embodiment, the fluid motors are mounted on a housing 20 for the control mechanism. To this end, the required linkage between the motor and particularly a piston rod and the clutch element is minimized.

Each housing 20 encloses generally the structure of FIG. 2. The housing is of improved and strengthened construction and includes a pair of side walls 22, 24, a front wall 26, a top wall 28 and a rear plate 30. The housing is supported on the rear wall 32 of the machine body. A mounting 34 secures the rear plate to the vehicle body through the agency of a plurality of bolts.

Figure 4:
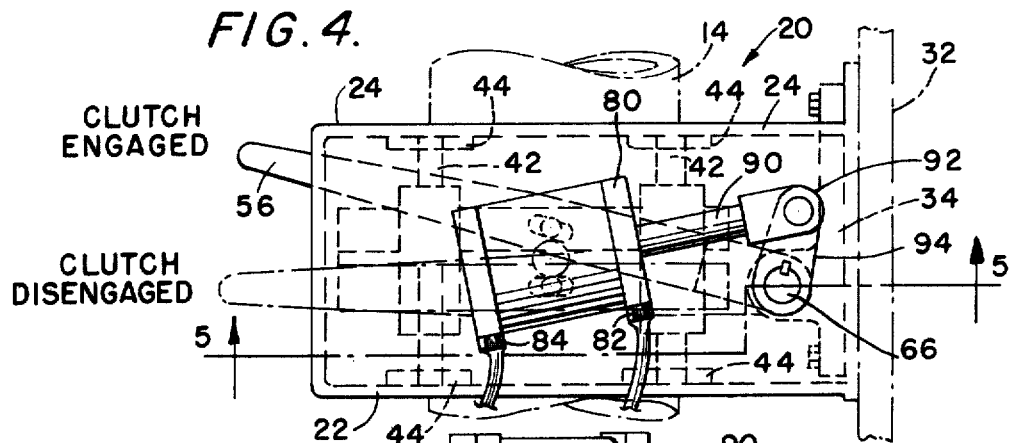
Figure 5:
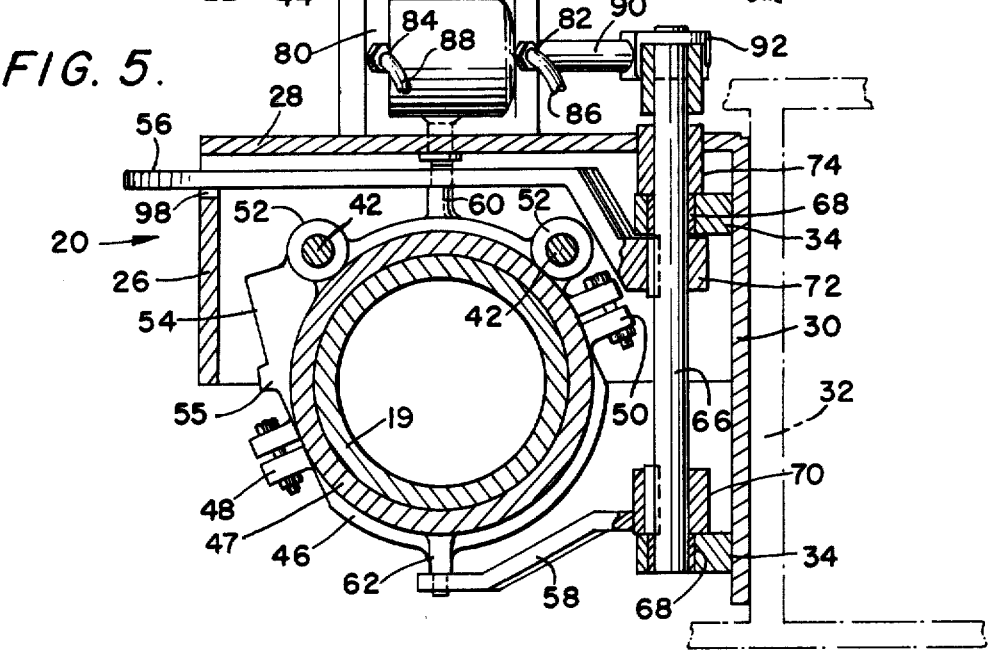
FIG. 5 is a vertical section as seen along the line 5-5 in FIG. 4.

The control mechanism may actuate the clutch element of a clutch mechanism to any one of a clutch engaged and disengaged positions (see FIG. 4) and a clutch locked position (see FIG. 3). The manner of and means for obtaining movement of the clutch element for engaging and disengaging the drive shaft 14 and crawler treads 12 and 12' as well as to lock the crawler treads may be seen to best advantage in FIGS. 2 and 6. For the sake of illustration and to permit a better understanding of the invention, the housing and certain other structural components not necessary for the following discussion have been removed from FIG. 2.

The clutch mechanism is represented only in general outline in FIG. 2 by the clutch element denoted by the numeral 40. Through intercooperation of mechanical and pneumatic components, the element of the clutch mechanism is movable to and fro in the direction of the arrows for engaging and disengaging the drive shaft 14 and crawler treads 12 and 12' and for locking the crawler treads. Each positional movement of the elements to like or different orientations determines the direction of movement that the machine will undergo. If, for example, the mechanism of FIG. 2 represents the right control mechanism (looking at the machine from the rear) movement of the clutch element toward the extreme right may be into a locked crawler tread position so that if the clutch element of the left control mechanism is positioned to engage the drive shaft 14 and crawler tread 12' the machine will turn to the right. Movement of the clutch element toward the extreme left may be into an engaged position so that if the clutch element of the left control mechanism is also engaged the machine will move either forward or backwards and if the clutch element of the left control mechanism is in the locked position the machine will turn to the left. A position of the clutch elements between the positions of engagement and locking is the position of disengagement of the drive shaft 14 and crawler treads 12 and 12'. Disengagement of both crawler treads will permit the machine to be pulled.

FIG. 6 illustrates the clutch mechanism which is controlled by the right control mechanism (the left control mechanism produces similar movement). The clutch element of the clutch mechanism selectively engages the drive shaft 14 with and disengages the drive shaft from the crawler tread which is driven by the driven member or output shaft 14'. The shafts are coaxially mounted and they carry within the region of their confronting ends a collar 15 and 15', respectively. The collars are immovably mounted on the shafts by employment of any well-known mounting structure. Each collar provides a plurality of external splines 17 and 17'. The clutch element 19 is supported concentrically in relation to collars 15 and 15' by a split collar and bearing ring received therearound. The clutch element, as will be discussed, is movable axially into the various positions referred to above. The clutch element 19 includes a plurality of internal splines (shown in dotted line) which mate with the external splines of the collars 15 and 15'. In FIG. 6 the clutch element is illustrated in the engaged position. Movement of the clutch element to a position at which it is substantially coextensive with the collar 15' results in disengagement of the drive to the crawler tread 12. Continued movement of the clutch element 19 in the same direction provides for locking of the crawler tread 12. To this end, a locking collar 15" providing external splines 17" is mounted concentrically with the collars 15 and 15' and in the path of movement of the clutch element 19. The collar 15" is fixed in any manner against movement. To this end, the collar 15" may be mounted to the frame of the machine. Thus, movement of the clutch element to a position of overlap of collars 15' and 15" locks the crawler tread.

A pair of guide bars 42 support the clutch collar 46 which operates clutch element 19 as described. A retainer 44 supported by the internal wall of the housing 20, in turn, mounts each bar in position parallel to the other. A split collar 46 is received in an annular groove in the clutch element 19 in a conventional manner such as by bolting together a pair of ears at 48 and 50. The collar carries a pair of mounts 52 formed with an aperture through the width thereof. The guide bars 42 are received within the apertures. Preferably, to reduce sliding friction, each mount supports a bushing which may be press fit therein. Lubrication of the bushing may be provided by means of a fitting (not shown) on the mount. The collar also provides a housing chamber 54 for an oil fill. A fitting 55 is positioned in the vicinity of and in communication with the chamber lower portion.

Actuation of the clutch and movement along the guide bars is accomplished by mechanical means with pneumatic assist. To this end, the mechanism includes a pair of clutch element shifter arms 56, 58. The arms are spaced apart to receive the clutch element therebetween. A pair of necks 60, 62 are formed on the collar and located at diametrically opposed positions. The neck 62 is connected to the arm 58 by means of a bolt received through an aperture in the arm. The upper arm 56 provides an elongated slot 64 for the purpose hereinafter to be discussed. The neck 60 merely passes through the slot to be confined by its outline. A shaft 66 is supported for rotation within the housing 20 by the mounting 34. The shaft supports the arms at the spaced locations. To this end, each arm terminates in or is supported by a sleeve 70, 72 which is received around and keyed to the shaft. A bushing 68 of the Oilite-type may be press fit in the mounting to assist in overcoming turning friction of the shaft. As may be seen, the shaft extends outwardly of the housing.

A bushing 74, for the same purpose as bushing 68, is press fit or otherwise received on the shaft within the region of the wall 28 of the housing.

A fluid motor 80 is mounted on the housing so that it is readily accessible for maintenance as necessary. The motor may be of the double acting air cylinder type. In this manner a more positive action into clutch engaged and disengaged positions may be obtained. Each fluid motor is disposed in a framework which serves to protect the cylinder from direct contact with moving structures or with falling material, such as rock debris. A pair of fittings, 82, 84 are carried by the framework and provide communication from outside of the cylinder to opposite ends internally of the cylinder. The double acting cylinder also provides safer action by the elimination of the heretofore required mechanical return actuation of the clutch element from the engaged position. Hose members 86, 88 are connected to the fittings and communicate a pressure source to the respective cylinder ends. The fluid motor is of conventional construction including a piston (not shown) movable within the cylinder under control of the pressure source. A rod 90 secured at one end to the piston is directly controlled thereby. A yoke 92 is secured to the other end of the rod and a crank 94 connects the yoke to the shaft 66. The crank is keyed to the shaft and is pivotably movable in the yoke about the pin 96. Thus, linear displacement of the rod 90 because of motor operation is translated into rotatable movement of the shaft 66 and ultimately movement of the clutch element, as described above.

Arm 56 serves as an actuator for clutch element movement. The actuator may be operated by hand or controlled at a panel within the reach of the operator within the cab of the machine. As illustrated, the arm 56 provides an extension from the region of the slot in order to project from the housing 20. An opening 98 in the rear wall of the housing accommodates the extension which, therefore, is accessible for manual operation or mechanical connection to the panel control.

From the above, it should be apparent that the present invention provides a mechanism for steering a vehicle which is an improvement over steering mechanisms which are known to the art. The present mechanism includes a shifting assembly for moving a clutch element into positions of engagement, disengagement and lock without binding of components. To this end, the clutch element is mounted on and movable along a pair of guide bars which are arranged in parallel fashion. To assist in ease of movement, the assembly includes a pair of arms which serve in part to oppose any turning movement of the clutch element which would tend to cause binding of the clutch element, during movement, along the bars. The arms are arranged at opposed positions to stabilize the clutch element in a vertical plane.

Further, the mechanism is disposed at the rear of the machine and conveniently accessible for required maintenance. Thus, down time and cost of repair may be reduced. The mechanism further provides a double acting cylinder for pneumatic assist of clutch element movement into and out of the various clutch positions. In this manner, the present invention provides a more positive control which is not achieved by the prior art steering mechanism employing pneumatic control in one direction and a spring return control in the other direction. In the present invention, the power motor, also, is disposed at the mechanical shifting assembly and thereby obviates the necessity of complex mechanical linkages as heretofore seen in the prior art. This disposition additionally permits access to the power motor for preventive or other maintenance.

In short, the present invention has provided a steering mechanism of more positive operation thereby to be more acceptable operatorwise, and one in which operating components are readily accessible so that down time and maintenance costs are reduced.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. In combination:
    a. a power driven machine having
       1. a frame,
       2. a drive member, and
       3. a driven member including ground engaging members, said drive and driven members being supported by said frame in coaxial and in substantial abutting relation;
    b. a control mechanism for steering said power driven machine, said control mechanism comprising
       1. a housing,
       2. means mounting said housing on said frame,
       3. clutch means,
       4. means supporting said clutch means concentrically of said drive and driven members for movement in opposite directions selectively to positions engaging said drive member with and disengaging said drive member from said driven member and locking said driven member,
       5. a pair of guide bars,
       6. retainer means within said housing for supporting said guide bars in parallel relation to the axis of said drive and driven members,
       7. means mounting said clutch means on said guide bars,
       8. means for stabilizing said clutch means against rotation relative to said axis, said stabilizing means including
          i. a shaft supported by said housing for rotation about an axis which is normal to said axis of said drive and driven member,
          ii. a pair of arms connected to said shaft and extending toward said clutch means, said arms being connected to said shaft at spaced locations such that one arm is disposed above said clutch mounting means and the other arm is disposed below said clutch mounting means, and iii. means carried by one of said arms and said clutch mounting means for mechanically connecting the same, one of said arms providing an actuator lever extending from the location of said mechanical connection to initiate said selective movement; and c. power assist means supported by said housing, said power assist means including
1. a cylinder,
2. a piston movable in said cylinder,
3. means to actuate said piston in opposite directions,
4. an actuating rod, said rod connected to said piston at one end, and
5. means for connecting said rod other end to said shaft for translation of piston movement to movement of said clutch means selectively into and out of said positions, said means to actuate said piston being responsive to movement of said actuator lever.

* * * * *